Patented July 9, 1935

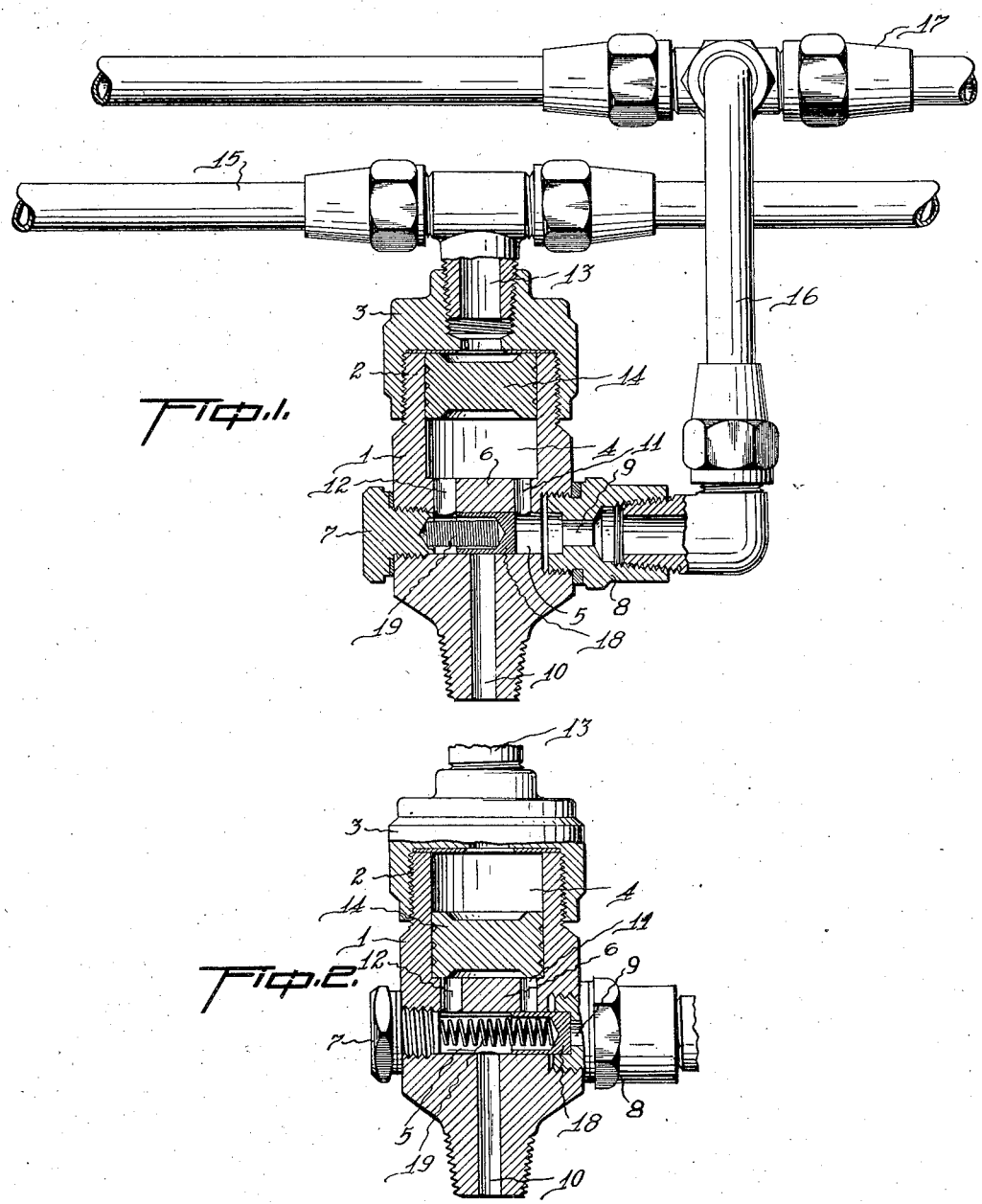

2,007,169

UNITED STATES PATENT OFFICE 2,007,169

LUBRICATOR VALVE

Leonard R. Kerns, Detroit, Mich., assignor, by mesne assignments, to The Farval Corporation, Cleveland, Ohio, a corporation of Ohio Application May 16, 1929, Serial No. 363,536

10 Claims. (Cl. 184—7)

The present invention pertains to a novel lubricating valve of the general type disclosed in my co-pending applications, Serial Nos. 341,958; 341,959 and 341,960, filed February 23, 1929 designed for use particularly in connection with centralized lubricating systems by means of which a number of bearings may be simultaneously lubricated from a given source of lubricant.

The type of valve herein referred to includes a main chamber and a valve chamber having respectively a pressure inlet and a loading opening, while the valve chamber also has an outlet for the delivery of lubricant to the delivery line. Loading and discharge ports connect the valve chamber to the main chamber, and a piston valve slidably mounted in the valve chamber is so dimensioned that in one position it permits communication from the loading opening through the valve chamber and loading port into the main chamber, while obstructing the final discharge outlet, and in another position allows communication from the discharge port through the valve chamber to the outlet but obstructs the loading opening from the loading port.

In the operation of such a device, the lubricant is fed into the main chamber when the valve is in the first position, and a spring behind the piston valve is relied upon to move the valve to the second position, whereupon pressure is applied to the inlet for the purpose of discharging the lubricant into the delivery line. It has been found however, especially in the case of heavy lubricants, that the pressure existing in the valve chamber after loading, is not overcome by the spring behind the piston valve, and consequently the latter does not readily move to the second position which permits discharge of the valve.

The object of the present invention is to overcome this difficulty and is accomplished by so arranging the piston valve that it does not obstruct the discharge port when in loading position. Consequently the pressure established during loading is applied to the rear of the valve, from the main chamber through the open discharge port, as well as to the face of the valve, and the valve is therefore balanced. When the loading pressure is relieved, the balance is overcome by the spring behind the valve, and the latter therefore readily moves to the second position which closes the loading port to the main chamber and opens the outlet from the valve chamber. The preferred construction consists in employing a spring of such dimensions that, when compressed, it serves as a stop which prevents the piston valve from completely covering the discharge port.

The invention is fully disclosed by way of example in the following description and in the accompanying drawing, in which—

Figure 1 is a sectional view of the valve in loading position; and

Fig. 2 is a similar section of the valve in discharging position.

Reference to these views will now be made by use of like characters which are employed to designate corresponding parts throughout.

As shown in Figures 1 and 2, the valve includes a body 1 having an open and threaded upper end 2 over which is fitted a cap 3. In the body is formed a main chamber 4 accessible through the upper open end, while beneath the chamber is a transverse or diametrical valve chamber 5. A wall 6 is retained between these chambers. One end of the valve chamber is closed by a plug 7 and into the other end is threaded a fitting 8, the bore 9 of which constitutes a loading opening as will presently appear.

The lower end of the body has an outlet 10, and the wall 6 is formed with a loading port 11 and a discharge port 12 which connect the valve chamber with the main chamber. The ports 11 and 12 have their axes at opposite sides of the axis of the outlet 10, the port 11 being nearer the loading opening 9 and the port 12 nearer the plug 7.

Into the cap 3 is fitted a fitting 13 which constitutes a pressure inlet to the main chamber 4. The chamber contains means such as a piston 14, whereby pressure from the fitting may be communicated towards the wall 6. The fitting 13 connects with a discharge pressure line 15 which may have similar nipples connecting with similar units. Likewise, the fitting 8 is connected to a loading line 16 leading from a main loading line 17 which may have other similar branches extending therefrom.

In the valve chamber 5 is slidably mounted a piston valve 18 behind which is a spring 19 bearing against the plug 7. In the loading position shown in Figure 1, this valve opens the port 11 to the valve chamber 5 and closes the outlet 10, while in the discharging position shown in Figure 2, the valve closes the port 11 to the loading opening but permits communication from the discharge port 12 through the chamber 5 to the outlet 10. In connection with Figure 1 it will also be seen that the spring 19 is so dimensioned that, when compressed, it functions as a stop, limiting the rearward movement of the valve 18 and preventing it from entirely covering the port 12.

The lines 15 and 17 are connected to a single unit or to separate units for supplying lubricant under pressure to the fittings 13 and 8 respectively, the line 17 being however in communication with the source which is intended to supply lubricant to the bearings. To the outlet 10 is connected a delivery line which conveys the lubricant to a bearing or to a series of bearings.

The lines 15 and 17 are each adapted to be operated under low and high pressure conditions, the high pressure line becoming the low pressure line for the succeeding stroke of piston 14, the opposite strokes of the piston 14 thus being provided by pressures from the respective lines.

As will be understood, the portion of chamber 4 below piston 14 constitutes the measuring chamber for the lubricant charge being produced and from which the charge is discharged toward the point of lubrication through outlet 10. This cycle is provided by first loading this chamber with the lubricant and then emptying it by movement of the piston 14 toward wall 6. The specific characteristics of the development of this cycle are as follows:

In the specific embodiment of the invention disclosed herein, the inactive position of the valve structure is shown in Fig. 2, in which piston 14 is located at the end of its stroke which emptied the measuring chamber. In this position, valve 18 is at the right end of the valve chamber, closing communication between the loading opening 9 and loading port 11, discharge port (permanently open) affording communication between the measuring chamber and valve chamber and through the latter to the outlet, the valve 18, in this position, not closing the outlet.

Pressure is now applied through line 17, line 15 being relieved of pressure at this time and becoming the low pressure side of the system. With pressure applied, valve 18 moves toward the left to first close outlet 10 and then open the loading port 11, this being the position of the valve 18 in Fig. 1. Since spring 19 forms a positive stop against the advance of valve 18 sufficient to close discharge port 12, the two chambers remain in permanently open communication.

Admission of the lubricant to the measuring chamber through the now-open loading port 11 serves to raise piston 14, the effect of which is to place discharge port 12 in open communication with the loading opening 9 through loading port 10, thus opening the left end of valve 18 to the pressure conditions. While this may appear to provide an excess pressure at the left of the valve 18—due to the added pressure of spring 19 now compressed—such condition is absent at this time, since the pressure within the measuring chamber is being determined by the low pressure line 15 at this time, due to the fact that this pressure is insufficient to prevent piston movement upwardly in presence of the pressure from the high pressure line 17; consequently, the pressure at the left of the valve 18 during this stroke of the piston 14 is the lower pressure conditions of the measuring chamber plus the stored pressure of spring 19, these being combinedly less than the pressure from line 17, with the result that valve 18 is held in the position of Fig. 1 during this piston stroke.

When piston 14 reaches the upper end of its stroke, it becomes non-yielding, thus raising the pressure in the measuring chamber to that of the loading line and consequently raising the pressure at the left of the valve 18 to the loading pressure plus the stored pressure of the spring, a preponderance of pressure at the left end of the valve. As long as the pressure in line 17 is maintained, valve 18 is not materially shifted from this position, although the preponderance of pressure is at the left, due to the fact that it is necessary to displace the lubricant of the valve chamber at the right of the valve. While the stored pressure of the spring might tend to move the valve toward the right in Fig. 1—it being possible to displace such advance lubricant into the measuring chamber and around to the left end of the piston—such valve movement is in the direction to shut off loading port 11 to not only reduce the portage for this transfer but also to shut off the measuring chamber from the pressure from 17. Consequently, valve 18 is substantially balanced in the position of Fig. 1, while pressure is presented from line 17, due to the inability of spring 19 to overcome this line pressure. When, however, the pressure in line 17 is reduced, the conditions change, and if the pressure in line 17 is reduced to a sufficiently low extent, the stored spring pressure may be sufficient to provide the necessary displacement of the lubricant back through the loading opening 9 to permit the valve to move to the position of Fig. 2.

However, it may not be desirable to reduce the pressure of line 17 to this extent, nor to await the completion of the displacement, and to meet this condition, the specific structure disclosed is utilized, the high pressure of line 15 being brought into action, this being the portion of the cycle present in moving the parts from the position of Fig. 1 to that of Fig. 2.

Assuming the valve 18 to be approximately in the position of Fig. 1, and the pressure in line 17 reduced, the development of pressure in line 15 serves to apply pressure on the upper side of piston 14 which is in the direction to move the piston downward from its Fig. 1 position. This necessarily places the measuring chamber under the pressure of line 15, now the high pressure line. While this would tend to produce equal pressures in ports 11 and 12 and thus seemingly equal at opposite ends of valve 18, such condition is actually not present, since the pressure of loading opening 9 is now the low pressure of line 17, while the pressure at the left of valve 18 is that of the measuring chamber plus the stored pressure of spring 19, the combined pressures rapidly displacing the lubricant at the right of valve 18 into opening 9, and seating valve 18 in its position of Fig. 1, and opening outlet 10. Spring 19 thus augments the pressure at the left and aids in the rapid shift of the valve to the position of Fig. 2. With valve 18 in the latter position, the continued application of pressure from line 15 serves to empty the measuring chamber through outlet 10.

The successive charges are practically uniform as to amount content, since successive operations are generally of similar nature. If there be small return to the loading line during the initial movement of the piston 14 from the position of Fig. 1, the action would be similar in successive charges, so that the quantity discharged is substantially the same with each operation, thus producing the characteristics of a measured charge.

The result is obtained by maintaining the measuring and valve chambers in permanent communication through port 12, with this communication at the end of valve 18 opposite that facing the loading pressure. Consequently, the left end of the valve 18 in the drawings is always subject to the pressure of the measuring chamber to which is added the variable pressures of the spring 19 produced by the movement of the valve, causing the valve 18 to move rapidly between its extremes of movement and thus avoiding the delays present where the spring pressure alone is utilized for displacing the head of lubricant, and making it possible to retain the low pressure line at a higher pressure.

What I claim is:—

1. In lubricating systems of the dual line type, wherein the lubricant for a charge is introduced into a measuring chamber from one feed line and the charge discharged from the chamber by pressure in the other line, and wherein the lines alternate as high and low pressure lines during the charge introducing and discharging operations, a valve structure operatively connected to both lines, said structure having a main chamber and a valve chamber with a wall therebetween, one of said lines being operatively connected with an inlet to the main chamber, the other line being operatively connected with the valve chamber, said wall having a loading and a discharge port connecting the chambers, means in the main chamber movable in opposite directions by lubricant under pressure in the respective lines and forming a wall of the measuring chamber, said structure also having an outlet leading from the valve chamber toward the point of lubrication, a piston valve slidable in the valve chamber by means of lubricant under pressure from said line connected to said valve chamber for selectively controlling the loading and discharge of the measuring chamber and movable between positions for closing the loading port and the outlet respectively, and means operative to limit valve movement relative to the discharge port to maintain communication between the measuring and valve chambers permanently open through the discharge port, said valve forming the sole control element for the movement of lubricant to and from the measuring chamber in the introduction and discharge of the lubricant charge.

2. A system as in claim 1, characterized in that the movable wall of the measuring chamber is in the form of a piston positioned relative to the inlet to the main chamber so that pressure through such inlet is operative to move the piston to discharge the contents of the measuring chamber.

3. A system as in claim 1 characterized in that the means for limiting the valve movement consists of a compressible spring, which when compressed serves as an abutment to limit the valve movement and which develops a stored pressure active to aid in shifting the valve in one direction.

4. A lubricator valve comprising a body having a main chamber and a valve chamber and a wall between said chambers, a fluid pressure inlet to said main chamber and an outlet from said valve chamber, said wall having a loading port and a discharge port connecting said chambers, said body having a loading opening to said valve chamber, means in the main chamber between the inlet and said wall for exerting pressure in said main chamber in the direction of said wall in presence of pressure from the inlet, a piston valve slidable in said valve chamber by means of lubricant under pressure from said loading opening and adapted to selectively obstruct said outlet and loading port, and means for limiting the valve movement to prevent valve closing of the discharge port and thereby maintain the two chambers in permanently open communication through the discharge port.

5. A valve as in claim 4 characterized in that the pressure exerting means of the main chamber is in the form of a piston which serves as a movable wall of the measuring chamber of the valve structure, piston movement in the direction of a stationary body wall being active to discharge the measuring chamber.

6. A valve structure as in claim 4 characterized in that the means for limiting the piston valve movement consists of a spring normally urging the valve in the direction of closing the loading port and being of such dimensions that, when compressed, will restrain the piston valve from closing the discharge port.

7. A valve structure as in claim 4 characterized in that the axis of the outlet is located between the axes of the loading and discharge ports, the valve chamber being closed at the end nearer the discharge port with the loading opening at the valve chamber end nearer the loading port.

8. A valve structure as in claim 4 characterized in that the location of the discharge and loading ports and the outlet are such that during movements of the valve between its extremes, said loading port and the outlet will be prevented from being opened or closed concurrently.

9. A lubricator valve comprising a body having a main chamber and a valve chamber and a wall between said chambers, said wall having a loading port and a discharge port connecting said chambers, said body having a loading opening to and an outlet from said valve chamber, means for exerting a fluid pressure in said main chamber in the direction of said wall, a piston valve slidable in said valve chamber by means of lubricant under pressure from said loading opening and adapted to selectively obstruct said outlet and the loading port, and means for preventing said valve from completely covering said discharge port while in maximum loading position said valve controlling the movement of lubricant from the loading opening to the outlet through the main chamber.

10. In lubricating systems of the dual line type, wherein the lubricant for a charge is introduced into a measuring chamber from one feed line and the charge discharged from the chamber by pressure in the other line, and wherein the lines alternate as high and low pressure lines during the charge introducing and discharging operations, a valve structure operatively connected to both lines, said structure having a main chamber constituting a measuring chamber and a valve chamber in communication at spaced-apart points, one of said lines being operatively connected with the main chamber, the other line being operatively connected with the valve chamber adjacent one of said points of communication to constitute the latter as a loading port for the measuring chamber and the feed line therefor a loading line, means in the main chamber to form a wall of the measuring chamber movable by lubricant under pressure in the respective lines, said structure having an outlet from the valve chamber toward the point of lubrication, a piston valve slidable in the valve chamber by means of lubricant under pressure from the loading line for selectively controlling the loading and discharge of the measuring chamber by selective control of the opening and closing of the loading port and said outlet respectively and operative to prevent through passage of lubricant between the loading line and the outlet, said valve controlling the movement of lubrication to and from the measuring chamber in the introduction and discharge of the lubricant charge, and means co-operative with the valve to prevent closure of the other point of communication between said chambers by the valve.

LEONARD R. KERNS.